(12) United States Patent
Reyna

(10) Patent No.: US 6,319,412 B1
(45) Date of Patent: Nov. 20, 2001

(54) WASTEWATER TREATMENT PROCESS

(75) Inventor: Crispen Reyna, St. Paul, MN (US)

(73) Assignee: New Working Waters, LLC, Saint Paul, MN (US)

( * ) Notice: Subject to any disclaimer, the term of this patent is extended or adjusted under 35 U.S.C. 154(b) by 0 days.

(21) Appl. No.: 09/611,209

(22) Filed: Jun. 28, 2000

Related U.S. Application Data

(63) Continuation of application No. 08/955,182, filed on Oct. 21, 1997, now abandoned.

(51) Int. Cl.[7] ............................................. C02F 9/00
(52) U.S. Cl. ..................... 210/666; 210/667; 210/669; 210/694; 210/716; 210/725; 210/728; 210/737; 210/917
(58) Field of Search ................... 210/666, 667, 210/669, 694, 917, 716, 725, 728, 737

(56) References Cited

U.S. PATENT DOCUMENTS

| | | | |
|---|---|---|---|
| 3,252,899 | * 5/1966 | Rice et al. | 210/666 |
| 4,008,161 | * 2/1977 | Wong et al. | 210/666 |
| 4,668,403 | * 5/1987 | Walterick et al. | 210/666 |
| 4,668,404 | * 5/1987 | Walterick | 210/666 |
| 5,360,551 | * 11/1994 | Weber | 210/917 |
| 5,529,696 | * 6/1996 | Tibbitts | 210/735 |
| 5,529,697 | * 6/1996 | Braasch et al. | 210/917 |
| 5,529,699 | * 6/1996 | Kuo et al. | 210/735 |
| 5,611,934 | * 3/1997 | Shepperd et al. | 210/917 |

* cited by examiner

*Primary Examiner*—Ivars Cintins
(74) *Attorney, Agent, or Firm*—Gary L. Huusko

(57) ABSTRACT

This invention relates to wastewater treatment, process and preferred systems for practice of the process for the removal of organic and inorganic ingredients contaminating wastewater, thereby to allow the reuse or sewer discharge of water used in various manufacturing and other processes. The process of the invention typically involves initial filtration of the wastewater and contact with a paste mixture consisting of magnesium hydroxide, aluminum hydroxide, calcium carbonate, magnesium orthophosphate, ferric sulfate, sodium hydrocarbonate, and activated carbon, the activated carbon removing organics such as dyes and the like while the paste mixture precipitates inorganics for subsequent mechanical removal. After treatment with the paste mixture, precipitating compounds are added to precipitate other inorganics. Flocculating agents are then added for further clarification purposes. Material removal then occurs by mechanical extraction including filtration, settling and the like. Chlorine is preferably effectively removed from the system during chemical treatment through initial acidification, thereby to reduce the potential for formation of highly soluble chloride salts. The present processes are preferably continuous or batch processes and are effected through the use of preferred systems including filtration, chemical treatment and settling sub-systems.

8 Claims, 1 Drawing Sheet

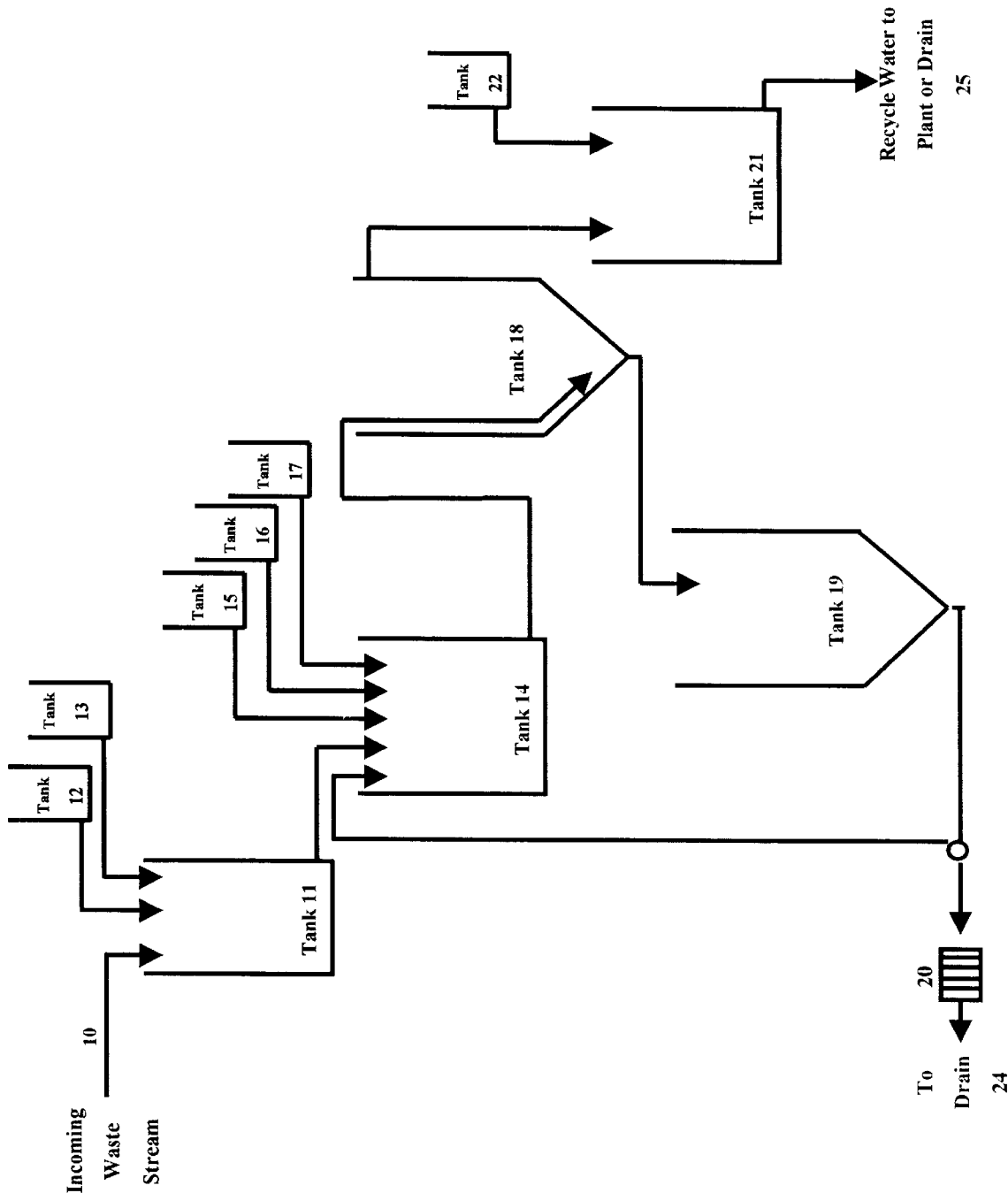

WASTEWATER TREATMENT PROCESS

This is a continuation application of prior application Ser. No. 08/955,182, previously filed on Oct. 21, 1997, now abandoned, and such specifically enumerated prior application is hereby incorporated herein by reference.

FIELD OF THE INVENTION

The invention relates generally to wastewater treatment and particularly to treatment of effluents containing dyes and other organics, particulates and inorganics existing in laundry or similar industrial processes.

DESCRIPTION OF THE PRIOR ART

Treatment of wastewater effluent from industrial processing has long been the subject of technical inquiry and practical application due not only to the continuing need for clean water but also due to the cost of water usage and discharge in the industrial sector. While the present methodology can extend to water reclamation and recycling in a number of industries including food processing, electronics manufacturing, metals plating, pulp and paper, etc., the present methodology is particularly useful for reclaiming and recycling water from the effluent of textile and dye plants and particularly in the processing of stonewashed and/or sandblasted garments wherein detergents, enzymes, fibers, surfactants, silicates, etc., must be removed from processing effluent with the treated water being sufficiently clean to allow recycle. Expensive water surcharge fees are thus avoided by the ability to reuse process water according to the invention. In the treatment of garments and similar items by stonewashing and the like, large amounts of water are necessary to form the process medium in which cotton "bluejeans" and garments formed of blends including polyester/cotton blends, rayon/cotton blends, etc. are treated. In typical stonewashing processes, an abrasive such as pumice is used in combination with detergents, bleach and enzymes to alter the color and texture of garments, these garments being processed in industrial washing machines with the treating materials which can further include dyestuffs, treatment periods varying from minutes to hours. A common practice in the prior art has been to simply discharge the effluent from such processing directly into the city wastewater systems. The continuing rise in the cost of water for initial process water makeup and the institution of sewer discharge fees causes prior art discharge practices to become prohibitively expensive. The need to recycle water from processing effluent has therefore become quite apparent in the laundry industry as well as industry in general.

Examples of prior art teachings intended particularly for the removal of dye materials from wastewater effluents are provided inter alia by Weber in U.S. Pat. No. 5,360,551, this patent removing color from dye wastewater through acidification and subsequent use of a cationic flocculent. An optional step in the Weber process is the addition of a reducing agent to produce a desired oxidation-reduction potential, the reducing agent being an alkali metal hydrosulfite, an alkaline earth hydrosulfite, mixtures thereof or combinations of an alkali metal bisulfite, an alkaline earth bisulfite, an alkali metal borohydride and mixtures thereof. In U.S. Pat. No. 5,611,934, Shepperd et al remove dye from process water effluent through treatment of the effluent with a reducing agent, adjustment of pH, treatment with a charged neutralization mixture and flocculation after a second pH adjustment. The particular charge neutralization mixture includes an aluminum salt and a cationic polymer consisting of a copolymer of acrylamide with a cationic monomer such as methacryloylethyltrimethlyammonium halide and further including organics wherein the mixture exhibits a Zeta potential of 15 millivolts. Flocculation agents according to Shepperd et al include anionic polymers such as acrylic acid/acrylamide copolymers and non-ionic polymers such as polyacrylamides. Further teachings of wastewater treatments for removal of organics include U.S. Pat. No. 5,529,696 to Tibbits; U.S. Pat. No. 5,529,697 to Braasch; U.S. Pat. No. 5,529,699 to Kuole, the Kuole patent particularly describing flocculating agents used in wastewater treatment processing.

Wastewater treatment according to the invention is particularly intended to remove color, reduce levels of TDS, TSS, BOD, and COD in order to achieve recyclability of process water with savings in makeup and disposal costs. The processes of the invention are particularly suited to treatment of wastewater effluents. In such processing, wastewater effluent containing detergents, enzymes, fibers, surfactants, silicates, dyestuffs and particulates are treated to allow reclamation of greater than 50% of water originally used for process water makeup. The present processes removes cotton lint, synthetic fibers, dissolved silica and solid particulates from the effluent and further removes coloring from dyes either added during garment processing or bleeding from garments during processing, such coloring typically being black, green, red, blue and the like. The present methodology also allows the removal of large quantities of soluble surfactants while lowering BOD, DOD, COD, TSS and TDS levels. The present methodology can be practiced inexpensively, the physical system necessary for practice of the methodology also being inexpensive to fabricate and operate.

SUMMARY OF THE INVENTION

The invention provides methodology and system architecture intended for treatment of wastewater emanating from industrial processes particularly including laundry processes which can involve bleeding from a garment of at least a portion of a dyestuff originally applied to the garment. The invention particularly intends the treatment of wastewater effluent from a laundry process such as the stonewashing of garments which can include the removal of dyestuffs from the garment and/or the replacement of dye or color to the garment, the processes of the invention being intended to remove dyestuffs and other organic materials, lint, fibers, silicates and inorganic solids inter alia from a laundry wastewater effluent in order to render the wastewater or effluent reusable in a laundering process or the like. A particular intent of the invention is the removal of materials from the wastewater effluent which materials were employed for treatment of garments in the process producing the wastewater effluent, such materials including detergents, enzymes, surfactants, silicates and abrasive particulates such as pumice and the like. Processing according to the invention lowers levels of TSS, TDS, BOD and COD so that water is reclaimed for process water makeup and/or discharge.

In a preferred embodiment of the invention involving the treatment of wastewater effluent from a laundry process, the wastewater effluent can optionally be filtered prior to subsequent chemical treatment. Since the present processes envision continuous flow or batch treatment of effluent of only a few gallons and up to millions of gallons daily, initial filtration may be waived as long as any particulate material which might be removed by initial filtration is not converted to a dissolved material by subsequent chemical treatment whereby said nearly dissolved material would be difficult to remove by subsequent chemical treatment. Initial filtration can be effected by passage of wastewater effluent through a shaker or cyclone to remove large bits of pumice or similar abrasive and other contaminants which are large enough to be trapped by filtration.

Preferred processes according to the invention include the step of acidification subsequent to optional initial filtration, it being the intent to achieve a pH in the effluent of between 2 and 5. Sulfuric acid is the preferred acidifying agent. The acidification step liberates chlorine which may be present in the system in order to prevent the formation of chloride salts which would be more soluble than salts intended to be formed during subsequent chemical treatment. Chemical treatment after the acidification step involves formation of relatively insoluble salts in order to facilitate removal of inorganics from the wastewater effluent. It is desirable according to the invention to reduce the presence of salts containing chlorides, which can interfere with subsequent clarification steps. Caustic soda is used for pH control and/or adjustment after the acidification step.

A temperature of approximately 40° F. to 140° F. should be maintained in the wastewater effluent in order for chemical treatment to proceed at a reasonable rate. An operating temperature of 70° F. to 100° F. is preferred. Higher temperatures can adversely affect solubilization, the formation of complexes or flocculation within the wastewater effluent.

The acidified wastewater effluent is treated according to the invention by passage of the effluent in contact with a treatment paste primarily formed of magnesium hydroxide and activated carbon. Activated carbon or activated charcoal is present at 1 to 50% for removal of color and organics from the effluent as well as other organic compounds, which may be present in the effluent. Magnesium hydroxide is present at 9% to 40% in order to formulate insoluble magnesium salts, aluminum hydroxide is present at 0.25% to 5% for flocculation, buffering and nucleation, calcium carbonate or calcium bicarbonate is present at 0.25% to 5% to introduce the carbonate for the reduction of nickel, cadmium, mercury, and lead, magnesium orthophosphate at 0.25% to 5% is present for the reduction of arsenic and fluorides and as a buffer for the caustic, ferric sulfate or ferrous sulfate at 0.01% to 1% is present for the ferric to help the reduction of chromium VI and maganese VI, the sulfate for the reduction of barium and lead, sodium hydrocarbonate or sodium carbonate or sodium bicarbonate is present at 0.25% to 1% for rapid initial pH and the carbonate for buffering of the caustic as the wastewater effluent flows in around the paste. Other precipitating agents such as ferric chloride or sodium aluminate may also be used. A portion of the paste can be recycled to the mix tank for further reaction with other wastewater effluent.

Flocculation through use of an ionic flocculent such as a highly water-soluble polyacrylonatrile polymer can then take place. A polyacrylamide can be used to cause flocculation of materials, which have not been absorbed by the activated carbon or precipitated by precipitating agents previously added to wastewater effluent. Depending upon the type of effluent to be treated, flocculents such as amines, polyacrylamides, ammonium chlorides or polydimethylammonium chlorides can be used as flocculating agents.

Settling can be employed for removal of precipitated materials and flocculated materials with filtration being employed as necessary. The resulting water can be recycled to a laundry process or other wastewater effluent producing processes or can be discharged to a system effluent, which meets applicable federal, state or local regulations. The same water can be treated up to ten times by the present processing prior to a need for discharge.

System architecture can include shaker filtration and cyclone apparatus capable of the initial filtration step described above. Filtration can be accomplished through the use of filter press apparatus utilizing diatomaceous earth. Further, bag filters can also be employed as well as other filtration apparatus known in the art. Tanks used for acidification as well as other chemical treatment including clarification can be tanks having conical lower portions, which facilitate precipitate removal, or settling. The physical system of the invention can be automated to include pH monitoring and PLC control as well as control of all plumbing including pumps and the like which involve charging of treating materials into the wastewater effluent.

While the present methodology is described herein primarily in reference to treatment of a wastewater effluent from a laundry, it is to be understood that the present methodology can be employed in food processing, beef and by products waste processing, pulp and paper processing, railcar and locomotive washing, metals and plating, mining, semiconductor and electronics manufacturing, and other textile and dye applications.

Accordingly, it is a primary object of the invention to provide wastewater treatment processes and preferred systems for practice of the processes which are intended to remove particulates and inorganics contaminating such effluents in industrial applications including laundries, beef processing, electronics manufacturing and the like.

It is another object of the invention to provide wastewater treatment processes and preferred systems for practice of the processes which are particularly intended to remove particulates, dyestuffs and inorganics as well as organics from laundries and similar processes to allow continuing recycle of recyclable water from wastewater effluent for process water makeup.

It is a further object of the invention to provide wastewater treatment process and apparatus wherein at least one precipitating agent formed into a paste with an absorbent such as activated carbon or charcoal is caused to contact waste water effluent in order to remove the contaminants from solution and place said contaminants into a form readily removed by physical removal processes.

Further objects and advantages of the invention will become more readily apparent in light of the following detailed description of the preferred embodiments.

BRIEF DESCRIPTION OF DRAWINGS

The drawing shows a schematic of the wastewater recovery system.

DESCRIPTION OF DRAWINGS

A wastewater recovery system is seen generally to comprise one particular system architecture that can be utilized according to the invention to practice the several methods of the invention. A wastewater effluent stream 10 enters the system at an entry tank 11. This effluent being from an industrial process of a type such as described herein. As noted herein, the present methodology and apparatus are particularly useful in the treatment of a wastewater effluent from a laundry process, such effluent typically including abrasives such as pumice, bleach, detergents and enzymes as well as lint, fibers dissolved silicates, particulate solids and organics including dyestuffs removed from the garment during stonewashing or added during the stonewashing process in order to effect a desired appearance of the processed garments. Wastewater effluents from garment washing processes such as laundry processes also typically include soluble surfactants.

The wastewater effluent can be filtered or subjected to another physical separation process for removal of particulates including large pieces of pumice. Conventional separatory processes including shaker filtration, cyclones and the like with mesh sizes of approximately 100 to 120 microns being preferred. The filtration step is optional and the wastewater effluent can be directed into the entry tank 11 without being subjected to a filtration or other separatory process. The wastewater within entry tank 11 is first acidified from an acid storage tank 12 to cause the pH of the wastewater to exist in the entry tank 11 at a pH between 2 and 5. A preferred acid for acidification purposes is sulfuric acid 66" Baume typically having an activity of 93%. The acid is charged into the entry tank 11 from the acid storage tank 12 by known automated control systems.

A paste is also discharged into the entry tank 11 from a paste storage tank 13. The paste being formed of magnesium hydroxide, aluminum hydroxide, calcium carbonate, magnesium orthophosphate, ferric sulfate, sodium hydrocarbonate and activated carbon or activated charcoal with minor amounts of sodium hydroxide and sufficient water to maintain a fluidity of the paste material. The paste is within the paste storage tank 13.

The wastewater contacts the paste within the interior of the entry tank 11 preferably in a continuous flow or batch process. The activated carbon or charcoal in the paste mixture removes coloring agents and organics from the wastewater in a manner as is known in the art. The paste acts to form insoluble salts and the like therefore precipitates inorganics from the wastewater.

The wastewater is then pumped from the entry tank 11 to a mixing tank 14 by means of a suitable pump. Wastewater entraining in its flow the insoluble salts produced in the mixing tank 14 as well as colloidal materials. In the mixing tank 14, precipitating agents such as iron sulfate, ferric sulfate, ferric chloride or sodium aluminate are added to the wastewater from a precipitating agent tank 15 in order to precipitate materials not precipitated by the paste in the mixing tank 14. An organic polymeric flocculating agent is also charged into mixing tank 14 from a flocculating agent tank 16, this agent preferably being an anionic flocculent such as water soluble polyacrylonitrile polymer. A polyacrylamide, specifically a Novafloc PHA, can be added to the mixing tank 14 from a polyacrylamide tank 17 at a level of 0.25% to 0.50% based on weight of the effluent wastewater to cause flocculation. The effluent from the mixing tank 14 is pumped to a clarification tank 18 with the flow through piping going over the top of the clarification tank 18 to the bottom of clarification tank 18. Clarification tank 18 has a fluidized bed made of the paste at the ratio of 10% to 25% by wt/wt. The effluent separates as it flows through the fluidized bed with the recyclable water being pumped with gravity flow to a reclaimed water tank 21. The solids and paste are pumped through the bottom of the clarification tank 18 to a separating tank 19. Up to 25% of the solids and taste can be pumped into the mixing tank 14 for more efficient use of the paste for cleaning the effluent and to form larger flocculent particle size which assists separation of effluent from recyclable water. The remaining paste is pumped through a filter press 20 to remove excess water to be discharged.

Reclaimed water in the reclaimed water tank 21 can be recycled or discharged as desired. Control of pH of the reclaimed water is effected at reclaimed water tank 21 by means of appropriate pH control equipment and chemical agents contained in chemical storage tank 22.

Approximately 95% of the treated water within the clarification tank 18 is taken directly to the reclaimed water tank 21, the water being recyclable at this point to recycle the water or discharge the water.

Particular note is taken of the paste involved in the wastewater effluent treatment in clarification tank 18. The paste preferably exists in clarification tank 18 in the form of a bed having a higher specific gravity than the wastewater effluent that is introduced into clarification tank 18. Accordingly, the bed of the paste lies at the bottom of the clarification tank 18 with the wastewater effluent flowing there through and into contact therewith over surfaces of the bed of material. During this treatment, the paste is being sacrificed in order to clarify and precipitate materials from the wastewater effluent.

Depending upon the capacity of the system, the present processes intend to be continuous or batch in nature and to process from one thousand to a million gallons per day of wastewater effluent. The capacity of the pump units and the size of the tanks chosen for the present system allow high efficiency within a low cost treatment system.

Flocculating agents such as amines, polyacrylamides, ammonium chlorides or polydimethlyammonium chlorides can also be used as flocculents depending upon the nature of the wastewater effluent. Colloidal and finely divided suspended matter is effectively removed from the wastewater effluent by treatment with the flocculating agents and the precipitating agents disclosed herein. Physical separatory processes including filtration, cyclones and settling remove precipitated and flocculated materials. Thus, the clarification tank 18 can also contain a cyclone to remove the precipitating agents, rather than relying upon gravity alone. Water may thus be reclaimed and reused over prior to discharging from the system. The system can further include monitoring and control modules such as the PLC control so support fully automatic operation of the system.

SUMMARY

The processes of the invention can be practiced other than as explicitly described herein with system architecture being other than as particularly shown in the drawing. It is further to be understood that wastewater effluents emanating from differing industrial processes can be treated according to the invention without substantial departure from the process explicitly described hereinabove for the treatment of wastewater emanating from a laundry process. Accordingly, the scope of the invention is to be determined from the scope of the claims appended hereto.

What is claimed is:

1. A wastewater treatment process for treatment of wastewater for recovery or discharge of recyclable water comprising the steps of:

adjusting the pH of the wastewater;

contacting the wastewater with a paste mixture of magnesium hydroxide, aluminum hydroxide, calcium carbonate, magnesium orthophosphate, ferric sulfate, sodium hydrocarbonate and activated carbon;

treating the wastewater with a precipitating agent and a flocculating agent to remove colloidal and finely divided solids;

and, separating relatively pure water from precipitated materials and treatment materials to reclaim the water or discharge the water from the process.

2. The process of claim 1 wherein the step of adjusting the pH of the wastewater comprises addition of sulfuric acid to cause the pH to be in a range between 2 and 5 thereby liberating chlorine and preventing chloride salts from being formed.

3. The process of claim 1 wherein the magnesium hydroxide, aluminum hydroxide, calcium carbonate, magnesium orthophosphate, ferric sulfate, sodium hydrocarbonate, and the activated carbon are admixed into a paste existing in the form of a bed having high surface area contact with the wastewater.

4. The process of claim 1 wherein the precipitating agent is selected from the group consisting of ferric sulfate, ferric chloride and sodium aluminate.

5. The process of claim 1 wherein the flocculating agent comprises polyacrylonitrile polymer.

6. The process of claim 1 wherein the flocculating agent is selected from the group consisting of amines, polyacrylamides, ammonium chlorides and polydimethylammonium chloride.

7. The process of claim 1 wherein an operating temperature range is maintained between 40° F. to 140° F.

8. The process of claim 7 wherein the operating temperature range is maintained between 70° F. to 100° F.

* * * * *